US005198978A

United States Patent [19]

Garneau et al.

[11] Patent Number: 5,198,978

[45] Date of Patent: * Mar. 30, 1993

[54] SYSTEM FOR FACILITATING THE SORTING OF NATIONAL LANGUAGE KEYS IN A DATA PROCESSING SYSTEM

[75] Inventors: Denis Garneau, Toronto, Canada; Wen-Hsiu Sears, Fort Worth, Tex.

[73] Assignee: International Business Machines Corporation, Armonk, N.Y.

[*] Notice: The portion of the term of this patent subsequent to Dec. 3, 2008 has been disclaimed.

[21] Appl. No.: 779,692

[22] Filed: Oct. 21, 1991

Related U.S. Application Data

[63] Continuation of Ser. No. 458,044, Dec. 27, 1989, Pat. No. 5,070,456.

[51] Int. Cl.[5] .................... G06F 15/38

[52] U.S. Cl. .................... 364/419

[58] Field of Search .................... 364/419, 200 MS File, 364/900 MS File

[56] References Cited

U.S. PATENT DOCUMENTS 4,122,533 10/1978 Kubinak .................... 340/324

5,109,352 4/1992 O'Dell .................... 395/150

*Primary Examiner*—Roy N. Envall, Jr.

*Assistant Examiner*—Xuong Chung

*Attorney, Agent, or Firm*—Andrew J. Dillon

[57] ABSTRACT

A method is disclosed for place value assignment for sortable keys in a National Language Support (NLS) data processing system. Each sortable key within the data processing system is assigned an alphabetic key value, a diacritic key value, a case key value and a special character key value. After building these key values for each key within the system, a place value may be assigned to each unique character which is based upon these four values. In one embodiment of the present invention, each character or key has a fixed length place value data frame associated therewith, with selected subsets of that data frame associated with each key value. This embodiment may require selected key values to be "padded" to fully occupy the designated subset within the fixed length place value data frame; however, the increased memory requirement which this approach requires will be offset by the ease of diagnosis and manipulation which this approach permits.

6 Claims, 3 Drawing Sheets

SYSTEM FOR FACILITATING THE SORTING OF NATIONAL LANGUAGE KEYS IN A DATA PROCESSING SYSTEM

This application is a continuation of application Ser. No. 07/458,044, now U.S. Pat No. 5,070,456, filed Dec. 27, 1989.

CROSS-REFERENCE TO RELATED APPLICATION

This application is related to U.S. patent application Ser. No. 07/458,046 filed of even date herewith by the inventors hereof and assigned to the assignee herein, entitled METHOD FOR KEY SEARCH WITHIN A NATIONAL LANGUAGE SUPPORT (NLS) DATA PROCESSING SYSTEM, and U.S. patent application Ser. No. 07/458,047 filed of even data herewith by the inventors hereof and assigned to the assignee herein, entitled METHOD FOR CULTURALLY PREDICTABLE KEY SORT WITHIN A NATIONAL LANGUAGE SUPPORT (NLS) DATA PROCESSING SYSTEM.

BACKGROUND OF THE INVENTION

1. Technical Field

The present invention relates in general to the field of data processing systems, and in particular to data processing systems designed to be utilized with multiple sets of keys and characters. Still more particularly, the present invention relates to data processing systems which permit the rapid and efficient utilization of keys and characters from different national languages.

2. Description of the Related Art

It has long been recognized that the accommodation of new and different national user requirements in data processing systems is quite important. So-called National Language Support (NLS) has been a goal of many computer manufacturers for a number of years. However, NLS is far more than the mere conversion of a system to a second language. In order to truly support a national language, it is necessary to provide a universal product which may be adapted to any particular market. A true National Language Support product must operate with immunity from any problems which arise due to the use of different sets of characters or words. Such as system must include facilities to render the interacting characters or words different for each language. A National Language Support data processing system must permit the manufacturer to readily install each set of characters and to efficiently change from one set of characters to another set of characters. These multiple character sets must be serviceable and facilities must be provided to test and assure the various design implementations which result.

There exists a growing market requirement for data processing systems which include National Language Support due to the increased number of people operating computer systems who do not speak English or speak only limited English. Additionally, computer customers generally desire to become self-sufficient in installing and utilizing computer products and as a result, it is necessary to implement the data processing system and its support information in a manner which will permit this.

One problem which exists with all previous attempts at National Language Support data processing systems is the inability of such systems to provide a consistently predictable and usable list of characters during any type of sort routine. One traditional approach to this problem is the binary sort in which the binary code representative of each character is utilized as the ranking value for that character during a sort. This technique produces a predictable result; however, the binary value of each character does not necessarily result in a sort which is immediately usable by the computer operator.

One effort to correct this problem has resulted in the shared weight technique whereby all graphic characters are grouped into families. Each group will have a unique binary weight, whether or not the character includes a diacritic mark or other indication that it should be treated differently. This technique results in a search which is intrinsically more appealing in its ordering; however, the results are not predictable due to the inability of such a system to distinguish between two characters which may be substantially different in a grammatical sense.

Therefore, it should be apparent that a need exists for a National Language Support data processing system in which each key or character within the system has a unique characteristic which may be utilized to manipulate and/or sort those characters in an efficient manner.

SUMMARY OF THE INVENTION

It is therefore one object of the present invention to provide an improved data processing system.

It is another object of the present invention to provide an improved data processing system which may be utilized with multiple different sets of keys and characters.

It is still another object of the present invention to provide an improved data processing system which permits the rapid and efficient manipulation of keys and characters from different national languages.

The foregoing objects are achieved as is now described. In accordance with the method of the present invention, each sortable key within the data processing system is assigned an alphabetic key value, a diacritic key value, a case key value and a special character key value. After building these key values for each key within the system, a place value may be assigned to each unique character which is based upon these four values. In one embodiment of the present invention, each character or key has a fixed length place value data frame associated therewith, with selected subsets of that frame associated with each key value. This embodiment may require selected key values to be "padded" to fully occupy the designated subset within the fixed length place value data frame; however, the increased memory requirement which this approach requires will be offset by the ease of diagnosis and manipulation which this approach permits.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
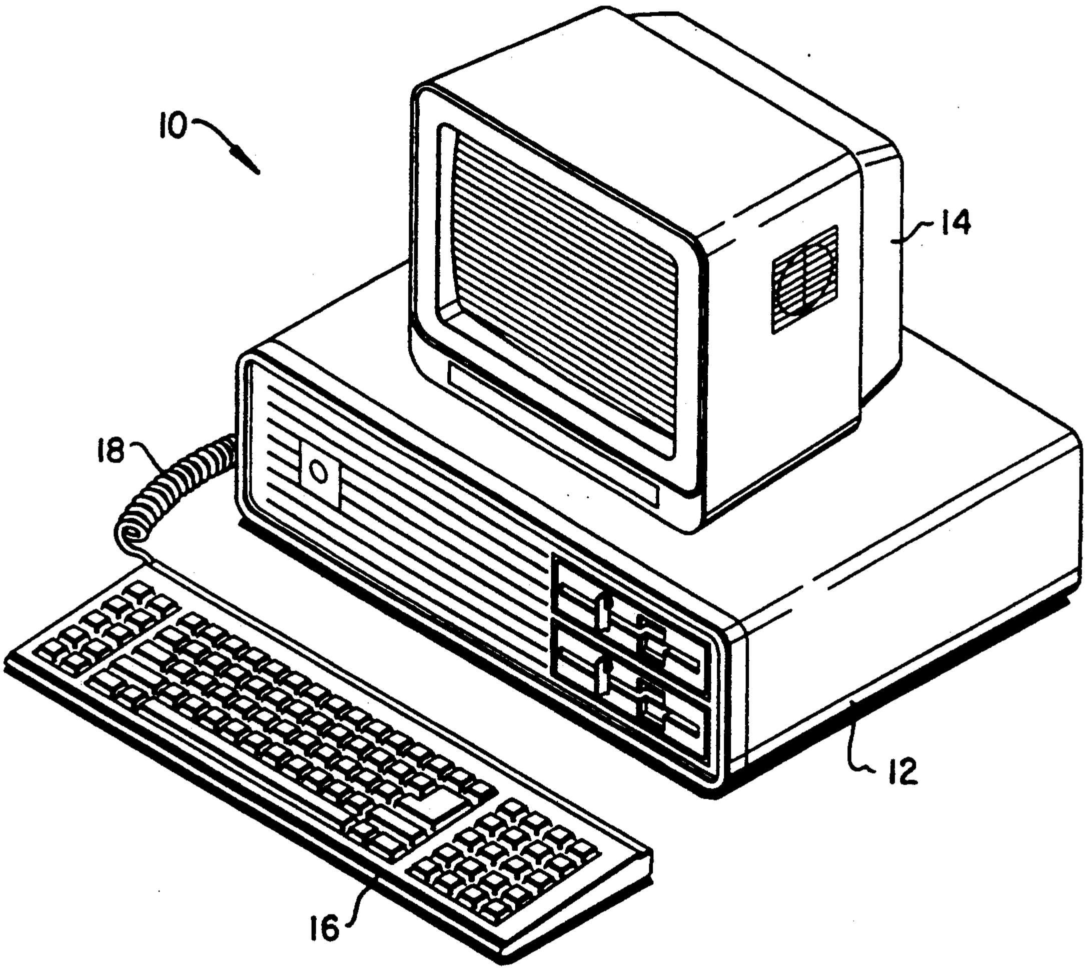
FIG. 1 is a pictorial representation of a data processing system which may be utilized to implement the method of the present invention.

With reference now to the figures and in particular with reference to FIG. 1, there is depicted a pictorial representation of a computer system 10 which may be utilized with the method of the present invention. As may be seen, computer system 10 includes a processor 12 which preferably includes a graphics processor, memory device, and a central processor (not shown). Coupled to processor 12 is a video display 14 which may be implemented utilizing either a color or monochromatic monitor, in a manner well known in the computer art. Also coupled to processor 12 is keyboard 16. Keyboard 16 preferably comprises a standard computer keyboard which is coupled to processor 12 by means of cable 18 and which preferably includes various national language characters or keys which are unique to a particular language.

Upon reference to the foregoing, those skilled in the art will appreciate that computer 10 may be implemented utilizing a so-called personal computer, such as the Model 50 PS/2 computer manufactured by International Business Machines Corporation of Armonk, N.Y. Several applications which may be utilized on this computer, such as Office Vision/2, Release 2, may be utilized in a National Language Support system wherein multiple foreign languages may be accommodated. For example, Office Vision/2, Release 2, will support English, German, French, Italian, Dutch, Portuguese, Belgian Dutch, Belgian French, Spanish, Danish, Icelandic, Finnish, Norwegian, Swedish, and Japanese. Additionally, other languages may be accommodated in future releases of such products.

In data processing systems which utilize characters or keys which may support these various national languages it has often been difficult to implement any type of sort procedure on the alphabetic characters contained within the system. One example in the prior art which has been utilized to implement such sort procedures is a binary sort in which the binary code of each character is utilized as the ranking value for each character and each alphabetic string is then sorted in this manner. A short example of a limited vocabulary which has been sorted utilizing this binary technique is listed below in Table I.

TABLE I

| |
|---|
| CO-OP |
| CONVEY |
| CONVEYANCE |
| COO |
| COOP |
| FRANK |
| Resume |
| co-op |
| coo |
| coop |
| frank |
| résumé |

Upon reference to Table I, those skilled in the art will appreciate that by utilizing the binary code for each character in an alphabetic string the resultant sort is predictable; however, it will contain a sublist due to the fact that upper case and lower case letters are substantially separated, in binary code value. Additionally, the binary sort technique will not accommodate the special characters, such as hyphen, or the accent marks which many foreign languages utilize.

Another technique which may be utilized to implement a more logically appealing sort technique is the shared weight technique. In the shared weight technique, each graphic character is grouped into a family of graphic characters wherein each group has a unique weight, whether or not a diacritical mark is also utilized and without distinction between upper case and lower case. Table II contains an example of a sort which has been implemented utilizing this technique.

TABLE II

| |
|---|
| co-op |
| Convey |
| Coo |
| coo |
| COO |
| coop |
| Cooperate |
| Frank |
| frank |
| FRANK |
| résumé |
| Resume |
| resume |

Upon a review of Table II, those skilled in the art will appreciate that while the grouping this sort technique provides is more intrinsically appealing, since it does not contain a sublist, the results are unpredictable due to the inability of this sort technique to distinguish between upper and lower case letters or accented or unaccented characters.

Figure 2:
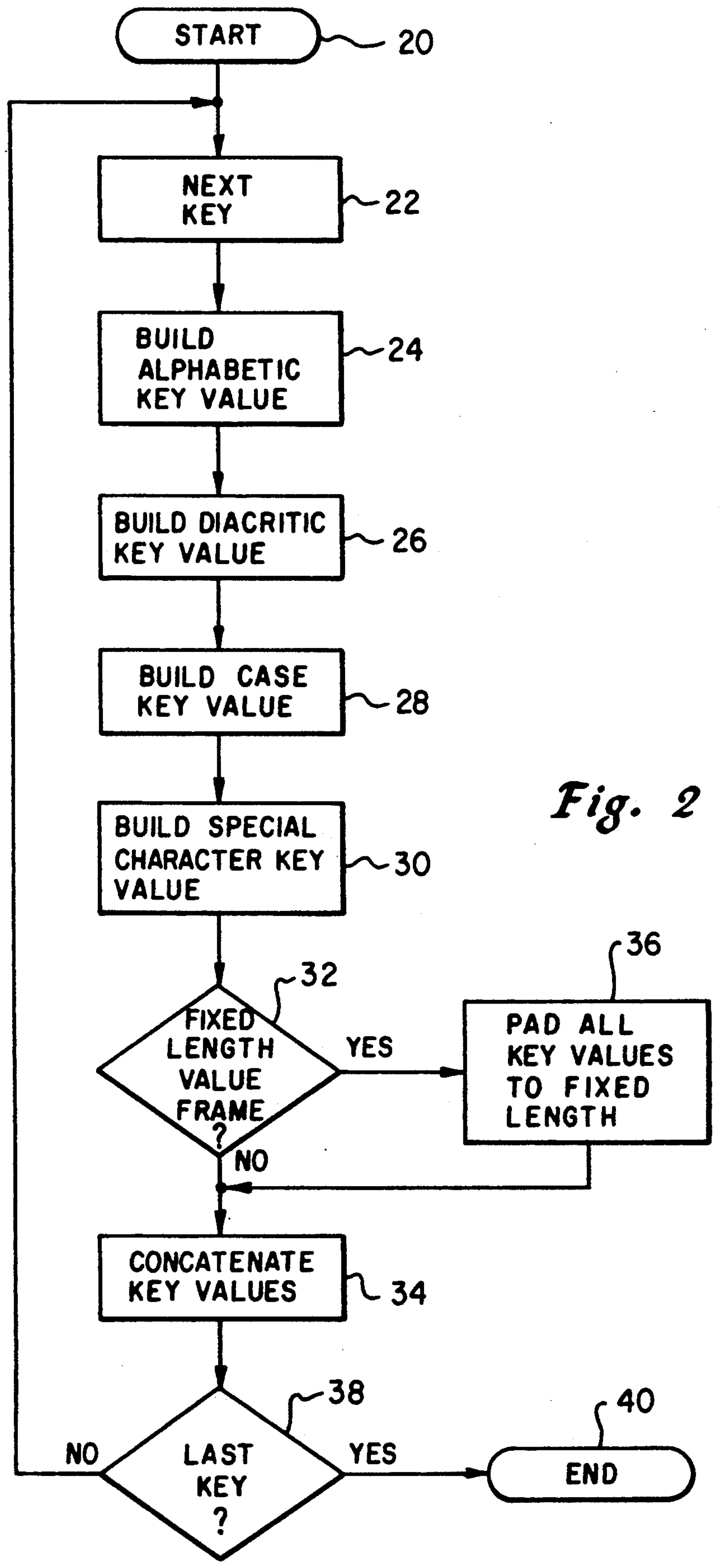
FIG. 2 is a logic flow chart illustrating the assignment of place values for national language characters utilizing the method of the present invention.

Referring now to FIG. 2, there is illustrated a logic flow chart which depicts the assignment of place values for National Language characters which utilizes the method of the present invention. As is illustrated, the process begins at block 20, and thereafter block 22 depicts the selection of the next key or character within an alphabetic string. Block 24 next illustrates the building of an alphabetic key value for that key character. The various key values assigned for each key or character may be implicitly weighted by selecting all values for a particular key value to be greater than the maximum value for a second or subsequent key value. In the embodiment depicted within FIG. 2, the alphabetic key values selected within block 24 may be selected such that minimum alphabetic key value contained therein is greater than any other key value which will be built. In this manner, the alphabetic key value will be entitled to the greatest weight during any type of sort procedure.

Next, block 26 depicts the building of a diacritic key value. Each diacritic key value will, in the disclosed embodiment of the present invention, represent a value which is less than the smallest alphabetic key value which has been assigned and which will represent the various diacritic marks which may be utilized in the selected National Language. Of course, those skilled in the art will appreciate that for alphanumeric characters which do not include a diacritic mark, the diacritic key value may be set to zero. Next, block 28 illustrates the building of a case key value. In the English language, this is a relatively simple evolution and only two possible case key values are required. For example, if it is desired to sort lower case alphabetic strings prior to upper case alphabetic strings, the lower case character will have a case key value of one and the upper case character will have a case key value of two. In this manner, any sort through a plurality of alphabetic character strings will always result in the desired order with respect to upper case and lower case values.

Finally, as illustrated in block 30, the fourth key value, the special character key value is built. Special character key values represent the rank value of the special characters which may be utilized in the selected language. For example, punctuation marks, parentheses, and various other non-alphanumeric characters. As discussed above, the special character key value of an alphanumeric character will preferably be set equal to zero.

At this point, block 32 illustrates a determination of whether or not the alphabetic character under analysis will include a fixed length value frame associated therewith in accordance with an important feature of the present invention. In this embodiment of the present invention, each alphabetic character within the system will have associated therewith a fixed length value frame which will include within fixed subsets thereof each of the values previously determined for the various key values. That is, the alphabetic key value will be contained within a fixed number of columns within such a fixed length value frame. Similarly, the diacritic key value, case key value and special character key value will always include the same number of bits and will be contained within predetermined fixed subsets of the fixed length value frame. In this implementation, it will be necessary, as illustrated in block 36, to pad all key values obtained to the necessary length to ensure that all alphabetic key values within a large number of such fixed length value frames will be aligned in an identical subset within each fixed length value frame.

Thereafter, as illustrated in block 34, the four key values herein constructed are concatenated to form a composite place value for a particular character or key within the system. By constructing a fixed length value frame, in accordance with the method of the present invention, which comprises the concatenated values of the alphabetic key values, the diacritic key values, the case key values and the special character key values for each character or key within the system, it will be possible to simply and efficiently manipulate keys or characters within the system and perform all manner of sort routines by merely aligning the fixed length value frame for two characters under consideration to rapidly and efficiently determine the precedence between the two characters under consideration. Additionally, by utilizing this technique, any error in sort routines which may occur may be simply and easily diagnosed by a rapid comparison of the fixed length value frame for each character or key in the error.

Finally, block 38 illustrates a determination of whether or not the last key within a particular string has been considered and if so, the process terminates, as depicted in block 40. If not, the process returns to block 22 and the next key is selected. Thereafter, the process iterates and continues to build alphabetic key values, diacritic key values, case key values and special character key values for each key within the system.

Figure 3:
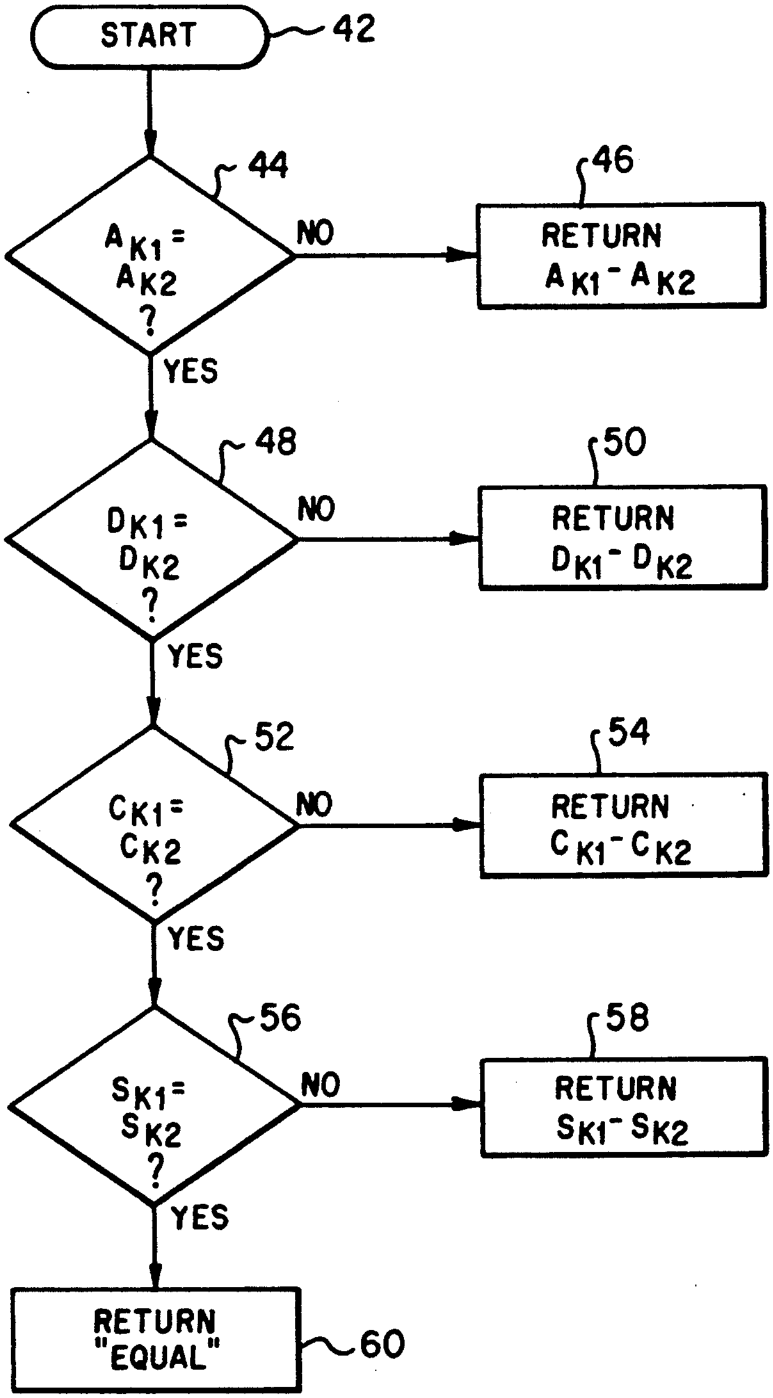
FIG. 3 is a logic flow chart illustrating the manipulation of national language characters utilizing the method of the present invention.

With reference now to FIG. 3, there is depicted a logic flow chart which illustrates the manipulation of National Language characters utilizing the method of the present invention. As is depicted, the process begins at block 42 thereafter proceeds to block 44 in which the alphabetic key values for two separate National Language characters are compared. In the event the alphabetic key values are not equal, then block 46 illustrates the returning of the difference between the two key values. This difference may be utilized to sort the two characters under consideration, in an ascending or descending sort, as those skilled in the art will appreciate.

In the event the alphabetic key values of two characters are equal, as determined by block 44, then block 48 illustrates a determination of whether or not the diacritic key values of the two characters are equal. In a manner identical to that described above, if the diacritic key values are not equal, the difference is returned, as depicted in block 50, in order that the two identical alphabetic characters may be sorted by means of the differences which exist in the diacritic key values for those characters.

In a similar manner, blocks 52 and 56 illustrate comparisons between the case key values and special character key values of the alphabetic characters under consideration. Only after all four key values have been compared and found equal, does block 60 depict the returning of an indication that the two characters are equal in value. Of course, those skilled in the art will appreciate that place values within a sort scheme in such a circumstance may be assigned based upon a "first in, first out" or any other similar sorting technique.

By utilizing the method of the present invention in which each alphabetic character or key within a National Language Support (NLS) data processing system includes four separate weights, instead of one weight, as known in the prior art, the sorting problems previously discussed may be eliminated. For example, by assigning a range of values which results in the maximum weight being assigned to the alphabetic key value, then the diacritic key value, then the case value and then the special character value, the sort process may be applied to the words previously listed in Table I and Table II with the result illustrated in Table III.

TABLE III

| |
|---|
| coo |
| Coo |
| COO |
| coop |
| co-op |
| cooperate |
| frank |
| Frank |
| FRANK |
| resume |
| Resume |
| résumé |

Upon reference to the foregoing those skilled in the art will appreciate that by assigning four weights for each character within a National Language Support (NLS) data processing system, with the various weights assigned to the alphabetic, diacritic, case and special character aspects of each key, it will be possible to accurate and predictably sort a plurality of alphabetic character strings in a manner which is intrinsically appealing from an intellectual standpoint and which is simple to implement in a consistent manner by the utilization of a fixed length value frame associated with each character or key.

While the invention has been particularly shown and described with reference to a preferred embodiment, it will be understood by those skilled in the art that various changes in form and detail may be made therein without departing from the spirit and scope of the invention.

What is claimed is:

1. A data processing system for facilitating the sorting of national language keys, said data processing system comprising:

means for assigning a selected alphabetic key value for each of said national language keys;

means for assigning a selected diacritic key value for each of said national language keys;

means for establishing a fixed length place value data frame for each of said national language keys, each of said fixed length place value data frames having a most significant digit, a least significant digit, a fixed portion of said fixed length place value data frame containing said selected alphabetic key value and a fixed portion of said fixed length place value data frame containing said selected diacritic key value; and means for thereafter determining a sort precedence between any two selected national language keys by a comparison of the fixed length place value data frames associated with said two selected national language keys.

2. The data processing system for facilitating the sorting of national language keys according to claim 1, wherein said fixed portion of said fixed length place value data frame containing said selected alphabetic key value comprises a portion of said fixed length place value data frame containing said most significant digit.

3. The data processing system for facilitating the sorting of national language keys according to claim 1, further including means for assigning a selected case key value for each of said national language keys.

4. The data processing system for facilitating the sorting of national language keys according to claim 3, wherein said fixed length place value data frame having a most significant digit and a least significant digit for each of said national language keys includes a fixed portion of said fixed length place value data frame containing said selected case key value.

5. The data processing system for facilitating the sorting of national language keys according to claim 3, further including means for assigning a selected special character key value for each of said national language keys.

6. The data processing system for facilitating the sorting of national language keys according to claim 5, wherein said fixed length place value data frame having a most significant digit and a least significant digit for each of said national language keys includes a fixed portion of said fixed length place value data frame containing said selected special character key value.

* * * * *